(12) United States Patent
Hsia

(10) Patent No.: US 6,378,892 B1
(45) Date of Patent: Apr. 30, 2002

(54) FOLDABLE STROLLER WITH DETACHABLE SUPPLEMENTAL SEAT

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 09/668,754

(22) Filed: Sep. 22, 2000

(51) Int. Cl.[7] .............................................. B62B 1/00
(52) U.S. Cl. ........................ 280/650; 280/642; 280/658
(58) Field of Search ................................. 280/650, 654, 280/657, 658, 641, 642, 79.2, 47.38, 30

(56) References Cited

U.S. PATENT DOCUMENTS

| | | | | |
|---|---|---|---|---|
| 4,747,526 A | * | 5/1988 | Launes | 280/30 |
| 4,989,889 A | * | 2/1991 | Server Perez | 280/40 |
| 5,201,535 A | * | 4/1993 | Kato et al. | 280/650 |
| 5,653,460 A | * | 8/1997 | Fogarty | 280/642 |
| 6,045,145 A | * | 4/2000 | Lan | 280/47.38 |
| 6,086,087 A | * | 7/2000 | Yang | 280/658 |
| 6,155,579 A | * | 12/2000 | Eyman et al. | 280/30 |
| 6,158,641 A | * | 12/2000 | Eyman et al. | 224/577 |

* cited by examiner

Primary Examiner—Christopher P. Schwartz
Assistant Examiner—Mariano Sy
(74) Attorney, Agent, or Firm—Raymond Y. Chan; David and Raymond Patent Group

(57) ABSTRACT

A foldable stroller which is equipped with a detachable supplemental seat includes a foldable stroller frame, a supplemental seat frame for supporting an additional seat fabric thereon including an inverted U-shaped main frame having a pair of S-shaped parallel supporting arms and a foldable frame extended between the two supporting arms of the main frame, and a pair of seat support joints securely connected to a front frame of the stroller frame for securely attaching two end portions of the supporting arms of the supplemental seat frame to two front posts of the front frame respectively. Furthermore, the supplemental seat frame further includes a pair carrying belts detachably attached to the main frame thereof and a pair of adjustable connectors for selectively adjusting the length of the carrying belts respectively in such a manner that the detached supplemental seat frame is capable of carrying on a user's back.

4 Claims, 6 Drawing Sheets

FOLDABLE STROLLER WITH DETACHABLE SUPPLEMENTAL SEAT

BACKGROUND OF THE PRESENT INVENTION

1. Field of Invention

The present invention relates to a stroller, and more particularly to a foldable stroller equipped with a detachable supplemental seat wherein the supplemental seat is capable of attaching to the foldable stroller for providing an extra seat for a second baby. Thus, the supplemental seat can be detached from the foldable stroller and carried by the user's back.

2. Description of Related Arts

Stroller, which becomes a necessity to every family having a young or baby, is considered as a conveniences tool to carry the baby or young child during outdoor activities such as foot traveling and shopping.

The problem is that when the parents who have one infant or baby, they would purchase a stroller for their first child. However, when they have one more baby, they may immediately purchase one more stroller, but it is impossible for a single parent to handle two strollers at the same time.

So, an improved stroller which comprises two seat frames can solve the above problem. However, such stroller must have a relatively large size in order to fit the two seat frames constructed therewith. The problem is that the parents may have difficulty to handle the stroller during outdoor activities. Thus, such stroller may occupy more space even though the stroller can be collapsed.

SUMMARY OF THE PRESENT INVENTION

A main object of the present invention is to provide a foldable stroller equipped with a detachable supplemental seat which is capable of providing an extra seat for a second baby, so that the parent can transport both babies at the same time.

Another object of the present invention is to provide a foldable stroller equipped with a detachable supplemental seat which can be detached from a stroller frame of the foldable stroller when it is not in use.

Another object of the present invention is to provide a foldable stroller equipped with a detachable supplemental seat, wherein the attachment of the supplemental seat with the foldable stroller is easy and fast.

Another object of the present invention is to provide a foldable stroller equipped with a detachable supplemental seat, wherein the weight of the baby applied on the supplemental seat will further ensure the attachment of the supplemental seat with the foldable stroller.

Another object of the present invention is to provide a foldable stroller equipped with a detachable supplemental seat which is adapted for individually folded up into a compact unit for easily storage and carriage, such that the supplemental seat would not occupy space for storage when the stroller is collapsed.

Another object of the present invention is to provide a foldable stroller equipped with a detachable supplement seat which can individually carry by the parent's back, so as to provide a multi-purpose supplement seat in order to fit the need of the parents.

Accordingly, in order to accomplish the above objects, the present invention provides a foldable stroller equipped with a detachable supplemental seat, wherein the foldable stroller comprises a stroller frame for supporting a fabric thereon, comprising:

a front frame comprising a pair of front posts and a U-shaped handle bar attached to top ends of the two front posts, wherein a pair of front wheels are rotatably mounted on bottom ends of the two front posts of the front frame respectively;

a back frame comprising a pair of back posts pivotally connected to the two front posts respectively, wherein a pair of back wheels are rotatably mounted on bottom ends of the two back posts of the back frame respectively;

a seat frame pivotally connected between the front frame and the back frame for supporting a baby to place thereon;

a supplemental seat frame for supporting an additional seat fabric thereon comprising an inverted U-shaped main frame having a pair of parallel supporting arms and a foldable frame extended between the two supporting arms of the main frame; and an attaching means for detaching attaching the main frame to the stroller frame.

DETAILED DESCRIPTION OF THE PREFERRED EMBODIMENT

Figure 1:
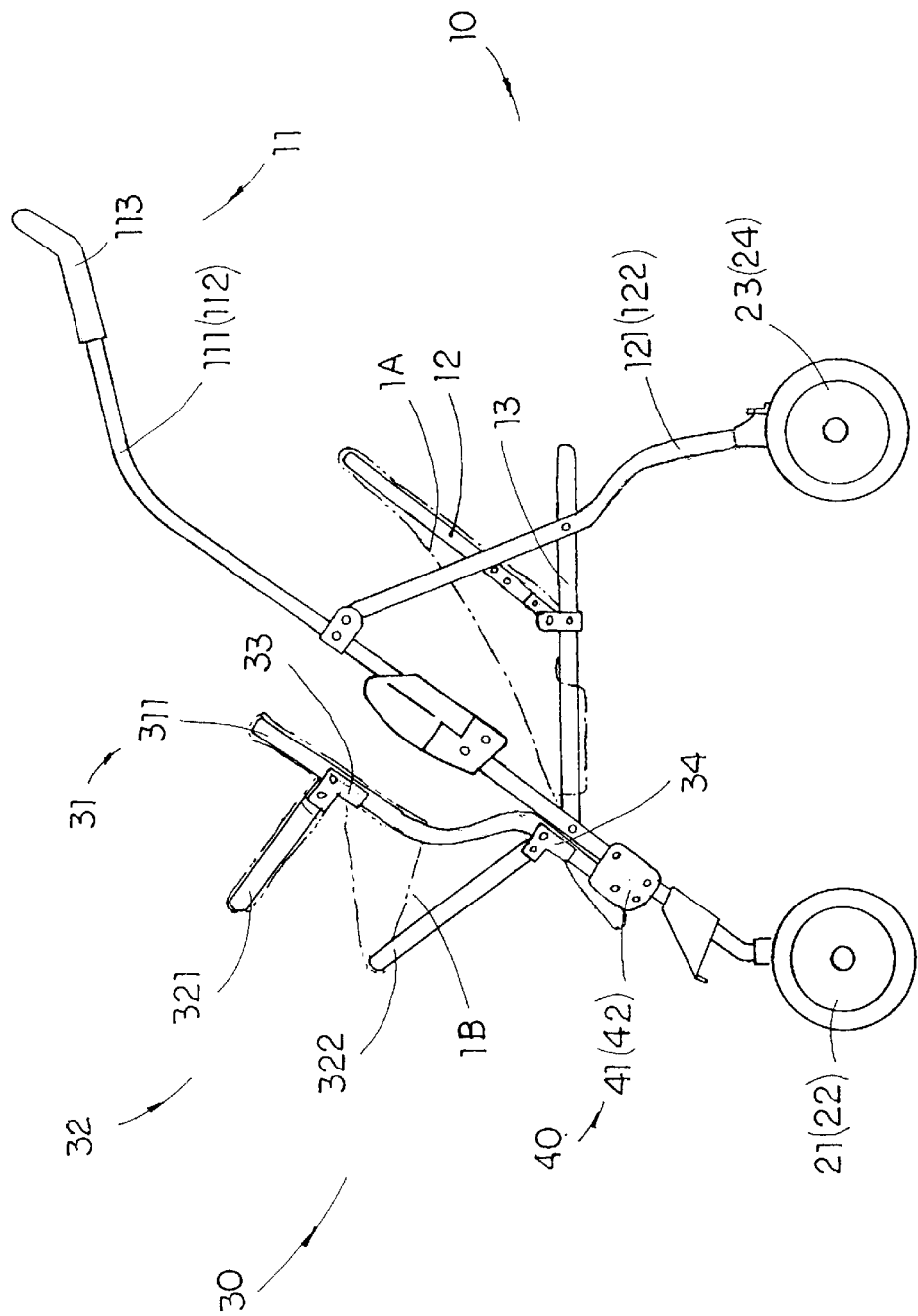
FIG. 1 is a side view of a foldable stroller with detachable supplemental seat according to a preferred embodiment of the present invention.
Figure 3:
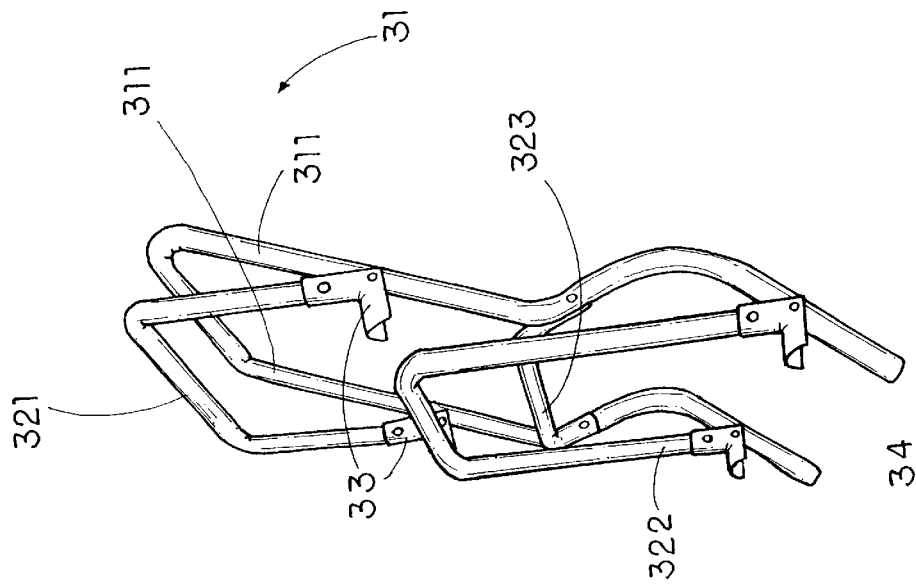
FIG. 3 is a perspective view of the detachable supplemental seat in a folded stated according to the above preferred embodiment of the present invention.

Referring to FIG. 1, a foldable stroller according to a preferred embodiment of the present invention is illustrated, wherein the foldable stroller is adapted for incorporating with a detachable supplemental seat in order to provide an extra seat for a second baby to place thereon.

The foldable stroller comprises a stroller frame 10 for supporting a fabric 1A thereon comprising a front frame 11, back frame 12, and a seat frame 13. Moreover, the foldable stroller further comprises a supplemental seat frame 30 for supporting an additional seat fabric 1B thereon and an attaching means 40 for detachably attaching the supplemental seat frame 30 to the front frame 11 of the stroller frame 10.

The front frame 11 comprises a pair of front posts 111, 112 and a U-shaped handle bar 113 attached to top ends of the two front posts 111, 112 wherein a pair of front wheels 21, 22 are rotatably mounted on bottom ends of the two front posts 111, 112 of the front frame 11 respectively. The back frame 12 comprises a pair of back posts 121, 122 pivotally connected to the two front posts 111, 112 respectively wherein a pair of back wheels 23, 24 are rotatably mounted on bottom ends of the two back posts 121, 122 of the back frame 12 respectively. The seat frame 13 is pivotally connected between the front frame 11 and the back frame 12 for supporting a baby to place thereon.

The supplemental seat frame 30 comprises an inverted U-shaped main frame 31 having a pair of parallel supporting arms 311 extended downwardly and a foldable frame 32 foldably extended between the two supporting arms 311 of the main frame 31 wherein the main frame 31 has a width which is a distance between the two supporting arms 311 same as a distance between the two front posts 111, 112 of the front frame 11 of the stroller frame 10.

Figure 2:
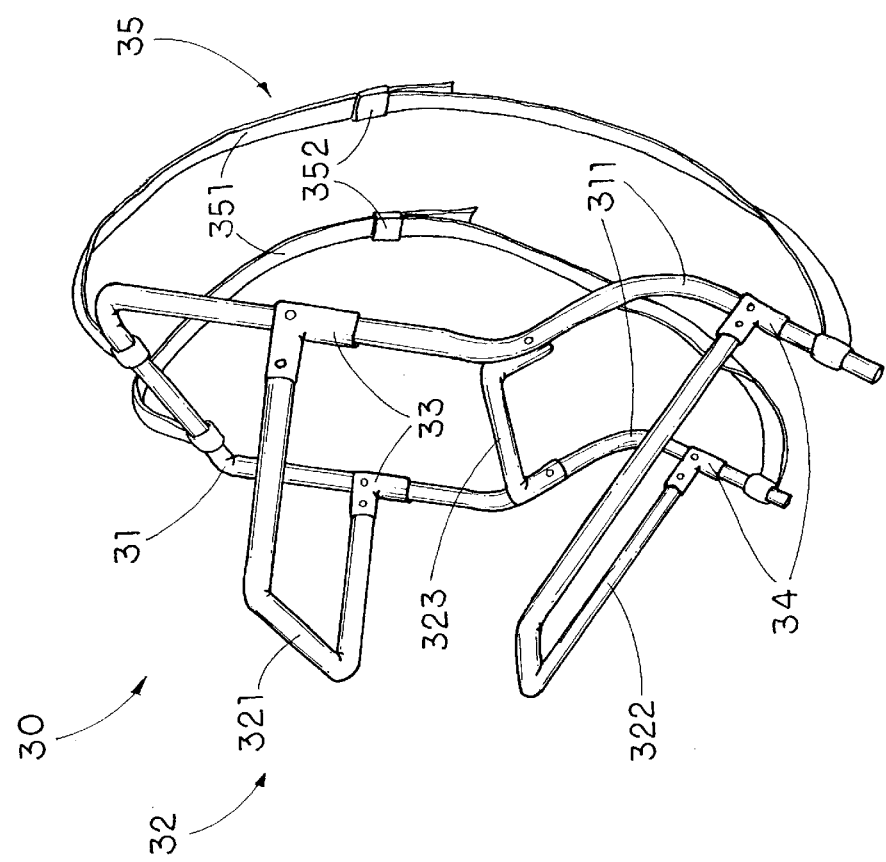
FIG. 2 is a perspective view of the detachable supplemental seat according to the above preferred embodiment of the present invention.

As shown in FIG. 2, each of the supporting arms 311 of the main frame 31 is formed as a S-shape structure in order to create more seating room for the baby. Furthermore, when the baby is supported on the supplemental seat frame 30, the center of mass which is the weight of the baby trends to move backward because of the S-shaped supporting arms 311 in such a manner that the baby trends to lay backwardly on the supplemental seat frame 30. So, the baby is securely supported on the supplemental seat frame 30 in a stable manner, so as to prevent the baby falling down from the supplemental seat.

The foldable frame 32 of the supplemental seat frame 30 comprises a U-shape handle frame 321 has two ends pivotally connected upper portions of the supporting arms 311, a U-shaped inclined supporting frame 322 has two ends pivotally connected lower portions of the supporting arms 311, and a seat supporting frame 323 connected between the two supporting arms 311.

Figure 4:
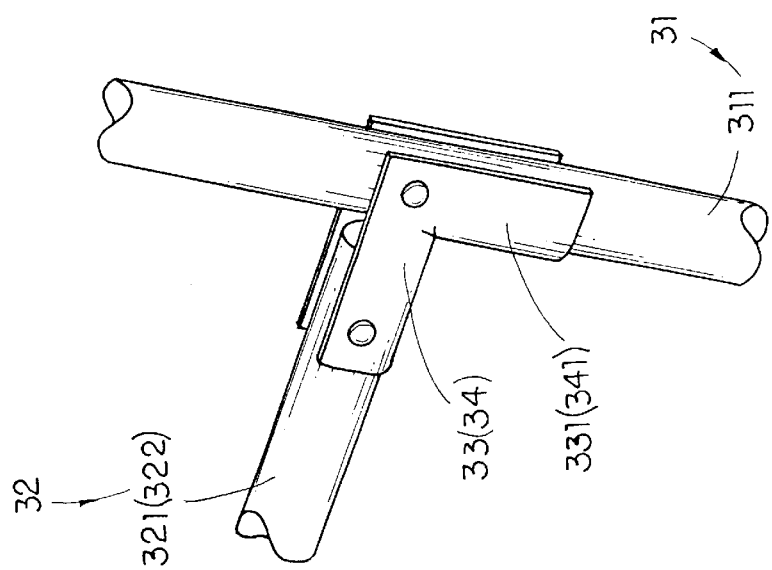
FIG. 4 is a perspective view of the folding joint of the detachable supplemental seat according to the above preferred embodiment of the present invention.

Accordingly, the supplement seat frame 30 further comprises two pairs of coupling joints 33, 34 for pivotally coupling the foldable frame 32 with the main frame 31 wherein each of the coupling joint 33, 34 is pivotally connected an end of the handle frame 321 and an end of the inclined supporting frame 322 to the respective supporting arm 311 of the main frame 31 respectively. The coupling joint 33, 34 further has a blocking wall 331, 341 having a U-shape cross section integrally and downwardly extended therefrom for biasing against the supporting arm 311 of the main frame 31 in such a downward rotatably movable manner, so as to limit the rotation angle of the handle frame 321 and the inclined supporting frame 322 respectively, as shown in FIG. 4.

Figure 5:
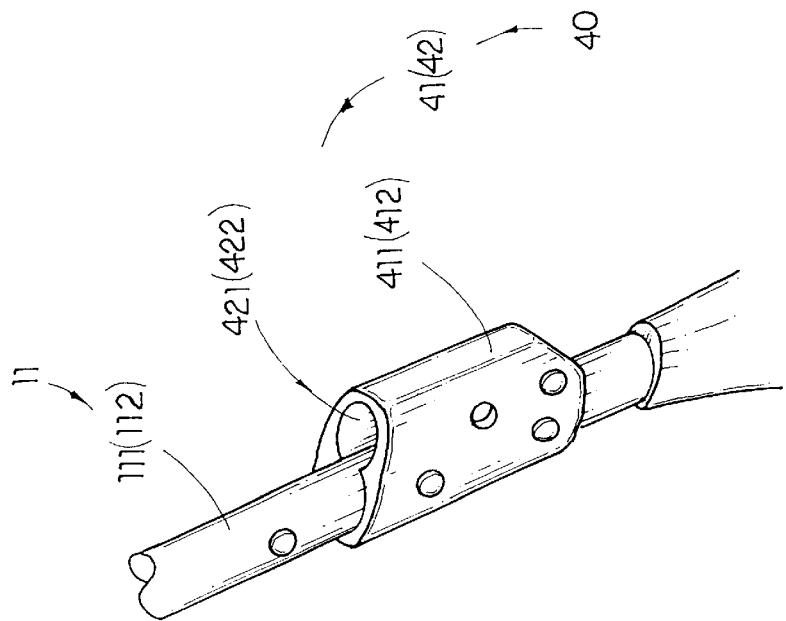
FIG. 5 is a perspective view of the attaching means of the detachable supplemental seat according to the above preferred embodiment of the present invention.

Referring to FIG. 5, the attaching means 40 comprises a pair of seat support joints 41, 42 securely connected to the front frame 11 for securely attaching two end portions of the supporting arms 311 of the supplemental seat frame 30 to the two front posts 111, 112 of the front frame 11 respectively. Each seat support joint 41, 42 has a joint body 411, 412 firmly affixed on the respective front post 111, 112 of the front frame 11 and a holder slot 421, 422 which has a diameter slightly larger than the respective supporting arm 311 and transversally extended to the joint body 411, 412 for the respective end portion of the supporting arms slidably inserting thereinto.

It is worth to mention that since the two end portions of the supporting arms 311 of the supplemental seat frame 30 are downwardly inserted into the two holder slots 421, 422 of the seat support joints 41, 42 respectively, the weight of the baby applied on the supplement seat frame 30 will further ensure the attachment of the supplemental seat frame 30, so as to prevent the supplemental seat frame 30 from accidentally detaching from the stroller frame 10.

Figure 6:
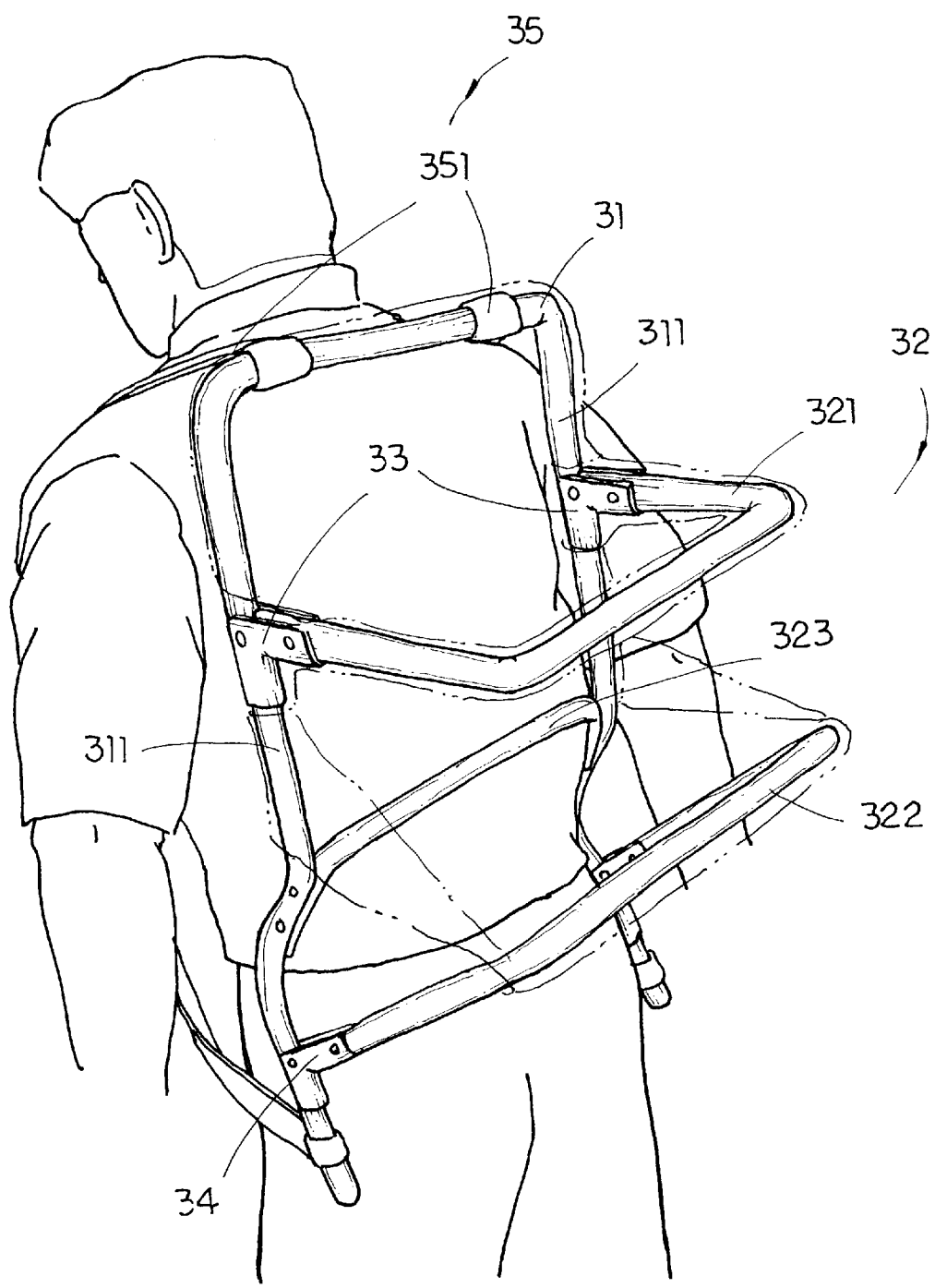
FIG. 6 is a perspective view of the detachable supplemental seat according to the above preferred embodiment of the present invention, illustrating the supplement seat being supported by a user's back.

Referring to FIG. 2, the supplemental seat frame 30 further comprises a carrying means 35 for carrying the supplemental seat frame 30 when the supplemental seat frame 30 is detached from the stroller frame 10. The carrying means 35 comprises a pair carrying belts 351 detachably attached to the main frame 31 and a pair of adjustable connectors 352 for selectively adjusting the length of the carrying belts 351 respectively. So, the user is able to carry the detached supplemental seat frame 30 at his or her back, as shown in FIG. 6, especially during outdoor actives such as foot traveling.

Figure 7:
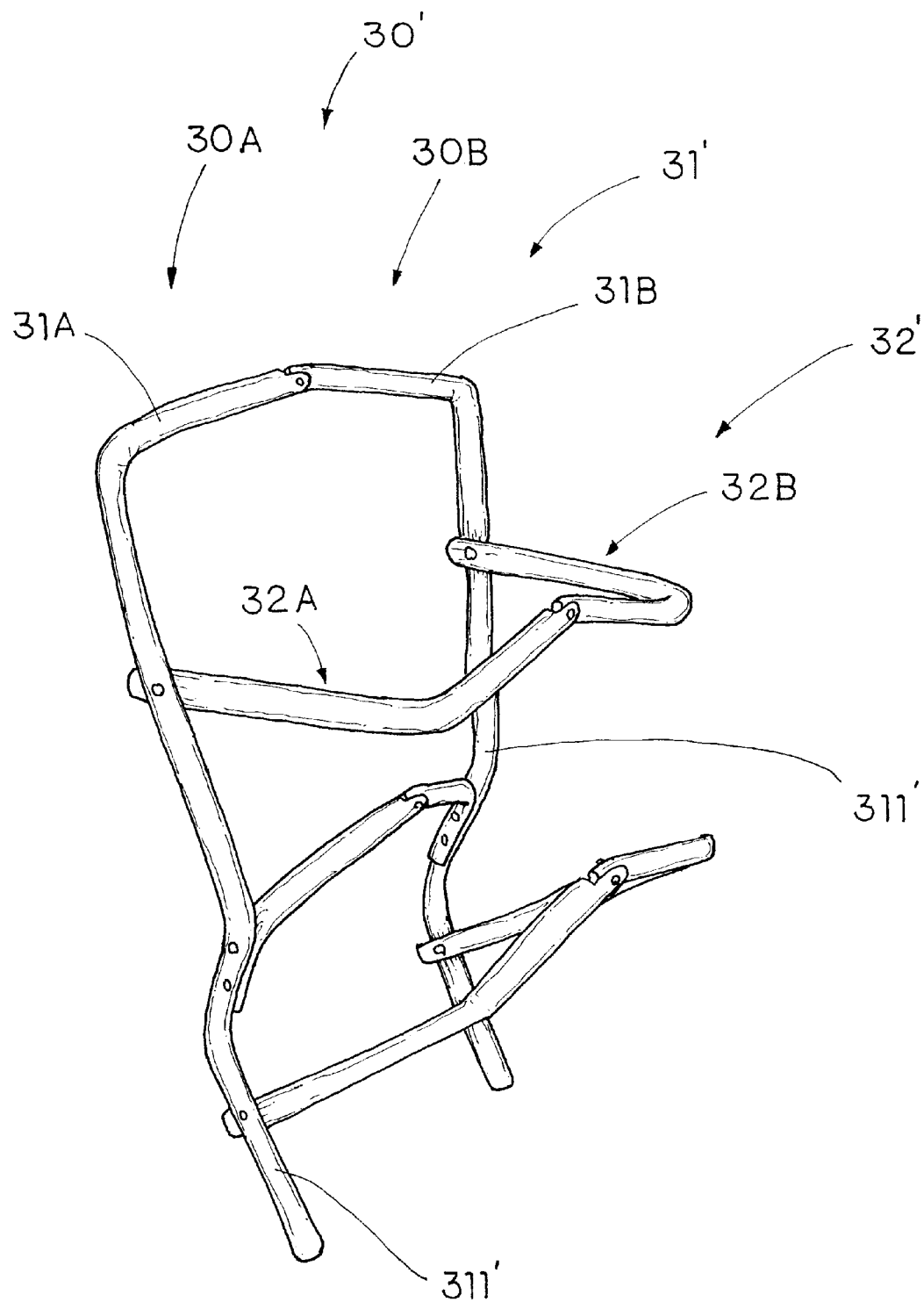
FIG. 7 illustrates an alternative mode of the detachable supplement seat according to the above preferred embodiment of the present invention.

FIG. 7 illustrates an alternative mode of the supplemental seat frame 30' according to the preferred embodiment of the present invention, wherein the supplement seat frame 30' has the same structural design as mentioned above.

The supplemental seat frame 30' comprises a main frame 31' having a pair of parallel supporting arms 311' extended downwardly and a foldable frame 32' foldably extended between the two supporting arms 311' of the main frame 31'. Accordingly, the supplemental seat frame 30' is evenly divided into a first supplemental seat frame portion 30A and a second supplemental seat frame portion 30B pivotally connected thereto such that the main frame 31' and the foldable frame 32' are also divided into a first and second main frame portions 31A, 31B and a first and second foldable frame 32A, 32B respectively. So, the supplemental seat frame 30' can be folded up while the first and second supplemental seat frame portion 30A, 30B are opposedly rotated upwardly, as shown in FIG. 7, so as to reduce the width of the supplemental seat frame 30'.

Figure 8:
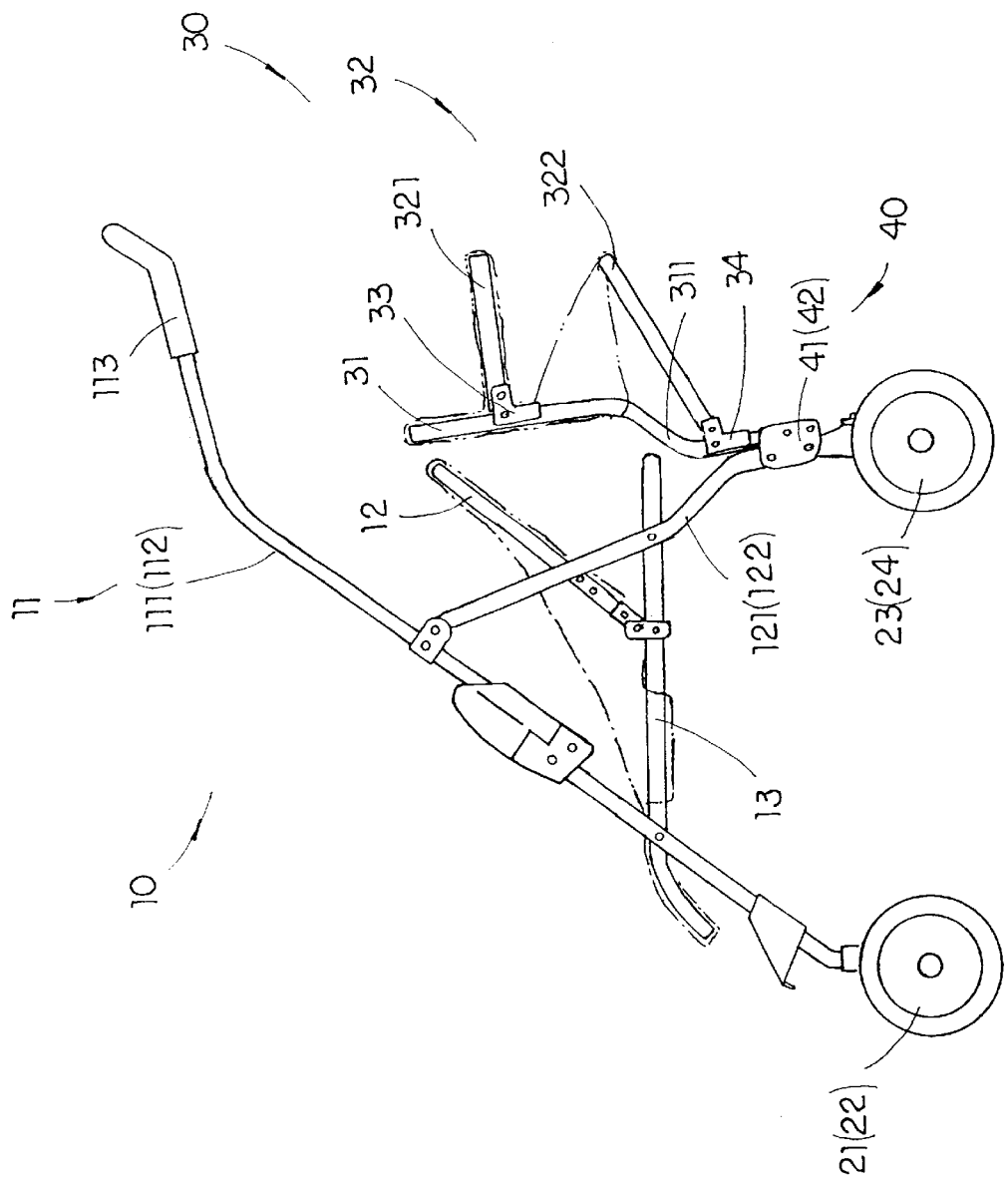
FIG. 8 is a side view of the foldable stroller with the detachable supplement seat according to the above preferred embodiment of the present invention, illustrating the supplemental seat being attached at the back of the foldable stroller.

As shown in FIG. 8, the supplemental seat frame 30 is also adapted for securely attaching to the back frame 12 of the stroller frame 10. For mounting the supplemental seat frame 30 at the back of the stroller, the pair of seat support joints 41, 42 are securely connected to back frame 12 for the two end portions of the supporting arms 311 of the supplemental seat frame 30 inserting into the holder slots 421, 422 of the two seat support joint 41, 42 in such a manner that the supplemental seat frame 30 is securely mounted on the two back posts 121, 122 of the back frame 12.

In other words, two supplemental seat frames 30 are adapted to detachably mount on stroller frame 10 while one of the supplemental seat frame 30 is mounted on the front posts 111, 112 of the front frame 11, and another is mounted on the back posts 121, 122 of the back frame 12. It is worth to mention that for such arrangement, the stroller frame 10 should be rigid enough for supporting two supplemental seat frames 30 mounted on the stroller frame 10 respectively. However, the original structure of the stroller frame 10 does not need to be altered in order to fit the supplemental seat frames 30 mounted thereon, which can minimize the manufacturing cost of the stroller frame 10.

What is claimed is:

1. A foldable stroller, comprising:
   a stroller frame which comprises:
   a front frame comprising a pair of front posts and a U-shaped handle bar attached to top ends of said two front posts, wherein two front wheels are rotatably mounted to bottom ends of said two front posts respectively;

a back frame comprising a pair of back posts pivotally connected to said two front posts respectively, wherein two back wheels are rotatably mounted to bottom ends of said two back posts of said back frame respectively; and a seat frame pivotally connected between said front frame and said back frame;

a seat fabric supported on said seat frame of said stroller frame; and a detachable supplemental seat, which comprises:

an additional seat fabric;

a supplemental seat frame, comprising an inverted U-shaped main frame, a pair of S-shaped supporting arms parallelly extended rearwardly and downwardly from two ends of said U-shaped main frame to define a distance between end portions of said supporting arms and said U-shaped main frame, and a foldable frame foldably connected between said two supporting arms to support said additional seat fabric in front; and a pair of seat support joints rigidly connected to lower portions of said two front posts of said front frame of said stroller frame respectively, wherein each of said seat support joints has a joint body firmly affixed to a lower portion of said respective front post of said front frame and a longitudinal holder slot extended along said joint body and parallel to said respective front post, wherein each of said holder slots has a diameter slightly larger than an end portion of said respective supporting arm, wherein said end portions of said two supporting arms are downwardly inserted into said two holder slots of said two seat support joints respectively to securely hold and mount said two supporting arms in an inclined position so as to detachably support said supplement seat in front of said front frame of said stroller frame in such a manner that a center of gravity of said supplemental seat frame is positioned backwards for ensuring a baby trends to lay backwardly on said supplemental seat frame while said distance defined between said end portions of said supporting arms and said U-shaped main frame substantially increases a receiving space between said back frame of said stroller frame and said supplemental seat frame of said seat frame.

2. The foldable stroller, as recited in claim 1, wherein said foldable frame of said supplement seat frame comprises a seat supporting frame connected between said two supporting arms, a U-shape handle frame having two ends extended from upper portions of said supporting arms respectively, and a U-shaped inclined supporting frame having two ends extended from lower portions of said supporting arms respectively, wherein said supplemental seat frame further comprises two pairs of coupling joints for pivotally coupling said foldable frame with said main frame, wherein said coupling joints pivotally connect said two ends of said handle frame and said two ends of said inclined supporting frame to said upper portions and lower portions of said two supporting arms of said supplemental seat frame respectively, moreover each of said coupling joint further comprising a blocking wall, having a U-shaped cross section, integrally and downwardly extended therefrom for biasing against said respective supporting arm in such a downward rotatably movable manner, so as to limit a rotation angle for said handle frame and said inclined supporting frame.

3. The foldable stroller, as recited in claim 1, wherein said supplemental seat frame further comprises a carrying means for carrying said supplemental seat frame when said supplemental seat frame is detached from said stroller frame, wherein said carrying means comprises a pair of carrying belts detachably attached to said main frame and a pair of adjustable connectors for selectively adjusting lengths of said carrying belts respectively.

4. The foldable stroller, as recited in claim 2, wherein said supplemental seat frame further comprises a carrying means for carrying said supplemental seat frame when said supplemental seat frame is detached from said stroller frame, wherein said carrying means comprises a pair of carrying belts detachably attached to said main frame and a pair of adjustable connectors for selectively adjusting lengths of said carrying belts respectively.

* * * * *